Aug. 20, 1929.   H. O. SIEGMUND   1,725,377
DIRECT CURRENT SUPPLY SYSTEM
Filed Sept. 10, 1927
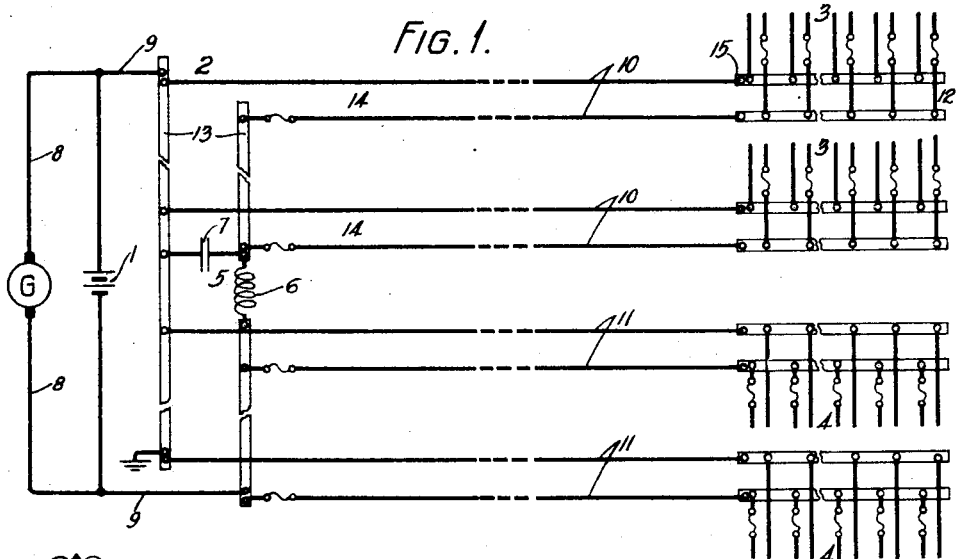
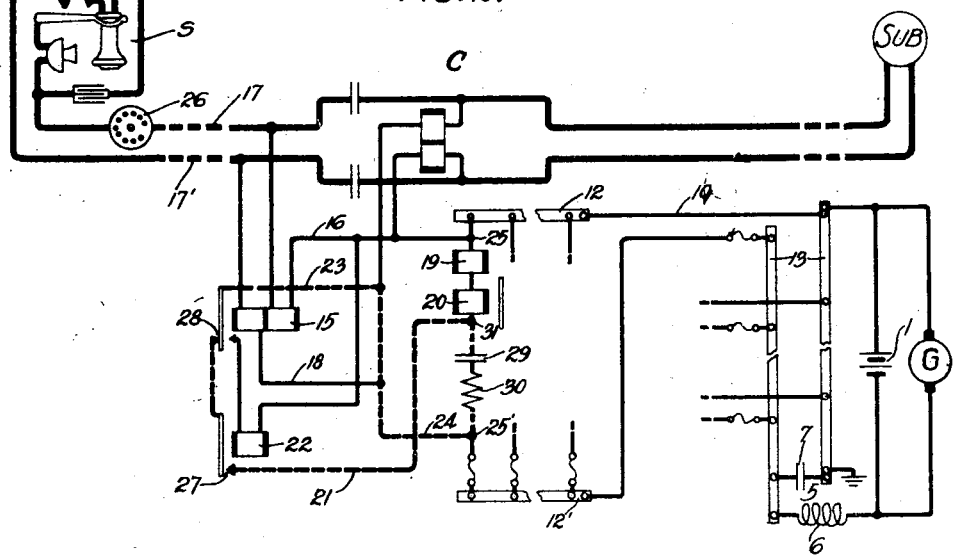
INVENTOR:
HUMPHREYS O. SIEGMUND
BY
ATTORNEY Patented Aug. 20, 1929.

1,725,377

UNITED STATES PATENT OFFICE.

HUMPHREYS O. SIEGMUND, OF WEST ORANGE, NEW JERSEY, ASSIGNOR TO BELL TELEPHONE LABORATORIES, INCORPORATED, OF NEW YORK, N. Y., A CORPORATION OF NEW YORK.

DIRECT-CURRENT-SUPPLY SYSTEM.

Application filed September 10, 1927. Serial No. 218,781.

This invention relates to noise protection filters and more particularly to those filters used in telephone exchanges having a central supply battery which is charged by means of a commercial charging generator.

It is characteristic of commercial generators that commutation gives rise to ripples or alternating currents of audible frequencies which if superimposed upon the talking circuits would result in poor quality transmission. One way of avoiding commutation effects in the past, has been by the use of specially designed generators. However, such generators were expensive and with the advent of machine switching and the increase in power requirements, economy dictated the abolition of costly generators and the introduction of the commercial type generator.

It is also customary in central offices to connect a large number of subscribers' lines to a common terminal or distributing fuse panel bus-bar to which talking current is supplied from a battery source by means of long leads which are common to all the above mentioned lines. The current leads provide a coupling impedance for all the lines, which if too large, results in crosstalk between respective lines. One method by which the objectionable effects of crosstalk were eliminated involved shunting a condenser across the leads at the distributing panel thereby decreasing the coupling impedance to meet transmission requirements with respect to crosstalk. However, in large central offices where the distributing fuse panels are in turn multiplied, a duplication of condensers at the distributing fuse panels is undesirable from an equipment standpoint.

An object of this invention, therefore, is to exclude from the subscribers' circuits, noises arising from the use of commercial type battery charging generators and also other electrical disturbances which are peculiar to the switching apparatus used in machine switching offices.

Another object is to reduce crosstalk between the various subscribers' lines which exists by virtue of the impedance of the long leads being common to all the talking circuits.

A feature of the invention relates to a noise protection filter used in conjunction with a central office battery having a commercial charging generator which supplies energy to a plurality of telephone discharge circuits.

Another feature of the invention involves positioning the filter at a point remote from a terminal, common to a plurality of subscribers' lines, but connected thereto by leads without causing the impedance coupling of the subscribers' lines thereby created to produce an objectionable condition with respect to crosstalk.

Still another feature of the invention concerns proportioning the inductance of the common leads joining the noise protection filter with the common terminal of the subscribers' lines with respect to the inductance and capacity of the filter to form an impedance coupling circuit for the subscribers' lines which will be resonant within the range of voice frequencies.

Another feature of the invention concerns the use of contact protecting condensers normally used in machine switching apparatus for the additional purpose of providing capacity for the noise protection filter.

A better understanding of the invention may be had by referring to the following description read in connection with the accompanying drawing in which:

Fig. 1 shows a general application of the invention;

Fig. 2 a more specific application as, for instance, when it is used in connection with step-by-step machine switching apparatus.

Like numbers refer to similar elements in all the figures.

Referring to Fig. 1, a direct current generator G of the type ordinarily used for commercial purposes is used to charge a telephone supply battery connected to a battery fuse panel 2 from which a plurality of talking circuits 3 and power circuits 4 are supplied with current.

In order that the alternating current ripples of voice frequency, characteristic of commercial generators from commutation and other causes be excluded from the talking circuits, a filter 5 comprising inductance 6 and capacity 7 is employed. This filter could be placed either in the charge leads 8 to the battery or in the discharge leads 9, but in the preferred embodiment of the invention, the filter is placed as shown between the leads 10 to the talking circuits 3 and the leads 11 to the power circuits 4, since in this position only the current supplied to the talking circuits need be filtered. Thus, a saving in the size of the filter is effected. Furthermore, in this position the noises inherent in the machine switching apparatus connected to the power circuits 4 are excluded from the talking circuits.

As is well known, it is common practice in telephone exchanges to multiple a large number of subscribers' or talking circuits to a common bus-bar 15 on a distributing panel 12 to which talking current is supplied by means of long leads 10 from a battery fuse panel 13 situated in another part of the building together with the batteries and generator therefor. The impedance of the leads constitutes a coupling impedance common to all the subscriber circuits 3 which, if not taken into consideration, would lead to an intolerable condition with respect to crosstalk between the various subscribers' lines. This coupling impedance was formerly reduced by placing a shunting condenser at the distributing fuse panel.

With the growth of large central offices many pairs of distributing circuits 14 were in turn multipled to the battery fuse panel bus-bars 13 so that the positioning of the shunt condensers at the distributing fuse panel would result in an inconvenient and undesirable duplication of condensers.

By means of this invention, therefore, the shunting condensers at the distributing fuse panel 12 may be abolished and sufficient shunting capacity included in the discharge filter 5 to maintain the coupling impedance below the requisite limit provided certain conditions are fulfilled which will now be described.

In a preferred form of the invention, the discharge filter 5 comprises an inductance coil 6 connected in series with the battery panel bus-bars 13 from which the discharge circuits 14 branch, and a condenser 7 connected in parallel therewith. As will be readily observed, the condenser is in parallel to all the discharge circuits. It has been found by experiment that the impedance to voice frequencies of the long leads is made up chiefly of an inductance component so that by providing a shunting condenser 7 in the filter having sufficient excess capacity, the inductance of the leads can be so proportioned that the circuit made up of the long leads 14 and the shunting condenser 7 which comprises the coupling means for the subscriber's circuit 3 will approach resonance at voice frequencies. As the resistance of the leads 10 is very small compared to their total impedance, the crosstalk thereby resulting will be within satisfactory limits.

Another embodiment of the invention is shown in Fig. 2 and is especially adapted to machine switching apparatus. The generator G, battery 1, filter 5, battery fuse panel 13, battery leads 10, and distributing fuse panel 12, respectively are similar to and serve the same purposes as the correspondingly designed elements described in Fig. 1.

In apparatus of this type, as applied in step-by-step systems, a subscriber's set S during a call is connected to the distributing fuse panel 12 by means of a connector C. The subscriber's cord circuit is of the bridged impedance type and consequently is less sensitive to noise than if a repeating coil connection were used. For this reason current can be supplied to both the talking circuits and the power circuits through the same battery leads, the interconnection of the two circuits being within the connector circuits.

The circuit for supplying talking current may be traced from the positive pole of battery 1, through the battery leads 10, distributing fuse panel 12, the connection 16, the right winding of the pulsing relay 15, through line 17, to the subscriber's set S and back through 17' to the left winding of the relay 15 and connection 18 to the other distributing fuse panel 12', and thence back to the other terminal of the battery.

The power circuit may be traced from the positive terminal of the battery 1 through the battery leads 10, the upper distributing fuse panel 12, through the windings of the magnets 19 and 20, the connection 21, the contacts of relay 22, the contacts of relay 15, the connections 23 and 24, through the lower distributing fuse panel 12', and back to the battery. The inter-connection between the power circuit and the talking circuit is shown at 25 and 25'.

As is well known in the art, when a subscriber wishes to make a call, the dialing switch 26 causes a series of current impulses to intermittently energize the relay 15, thereby causing a circuit to be completed through the windings of the magnets 19 and 20 every time the contacts 27 and 28 are closed. The relay 22 is a slow-release relay which remains energized throughout each train of impulses. On account of the large current necessary to operate the magnets 19 and 20 and due to the inductive energy stored therein the contacts 28 would soon be destroyed by the arc which would form on the breaking of the circuit between impulses if no protection were provided.

In accordance with this invention, the contact protecting condenser 29 and resistance 30 are placed in shunt to the circuit including its contact 28 as shown dotted in the drawing, and when thus connected it will be observed that the condenser 29 will at all times be shunted through the magnets 19 and 20 and the resistance 30 across the distributing fuse panels 12 and 12'. This circuit can be traced from the winding of magnet 20, at 31, connection 21, contacts 27 and 28, connections 23 and 24 to the interconnection 25. Upon the breaking of contact 28, the energy stored in the magnets 19 and 20 will be dissipated in the condenser 29 and resistance 30. For the sake of clearness in the drawing only one connector is shown connected at the distributing fuse panel but it is to be understood that in the ordinary exchange the number of contact protections thus positioned may be as many as 3000 or more. The capacity provided by all the condensers similar to 29 shunting the distributing panel in the aggregate is such as to materially reduce the amount of shunting capacity which must be provided in the filter 5 and in some cases, the filter condenser 7 can be entirely eliminated. Thus by this invention the condensers 29 are made to serve the dual purpose of providing contact protection and filter capacity.

Although for the sake of clearness, specific embodiments of the invention have been described, it is to be understood that the invention is to be limited only by the scope of the appended claims.

What is claimed is:

1. In a direct current supply system, a plurality of circuits, leads having inductance for supplying energy to said circuits from a remote point, said leads forming a coupling impedance for said circuits, and a capacity at said remote point for compensating for the effect of said lead inductance.

2. In a direct current supply system, a plurality of circuits, leads having inductance for supplying energy to said circuits from a remote point, means at said remote point comprising a capacity for maintaining said circuits substantially free from noise currents, said capacity compensating for the effect of said lead inductance.

3. In a direct current supply system, a plurality of circuits, common leads for supplying energy to said circuits from a remote point, means at said remote point comprising a capacity for excluding noise currents from said circuits, said leads and said noise excluding means forming a common coupling impedance to said circuits, said coupling impedance being reduced to a minimum by properly proportioning said capacity to offset the inductance of said common leads.

4. In a direct current supply system, common leads to supply energy to a plurality of circuits, and a noise protection filter having capacity and inductance, said common leads and said filter providing a common coupling impedance for said circuits, the inductance of the common leads being proportioned so as to offset a capacitive reactance component in the remainder of the coupling circuit.

5. In combination, a plurality of current distributing circuits having a common terminal, means forming a coupling impedance for said circuit comprising leads having inductance connected to said terminals for supplying energy to said circuits from a remote point, said means also comprising a condenser at said remote point, said condenser providing capacity for offsetting said lead inductance to reduce said coupling impedance to a minimum.

6. In combination, a plurality of circuits having a common terminal, a source of energy for said circuits situated at a remote point from said terminal, leads constituting impedance common to said circuits joining said source with said common terminal, and means comprising other impedance located in part at least at said remote point for reducing the coupling effect of said common impedance to a minimum.

7. In combination, a plurality of circuits having a common terminal, a source of energy for said circuits situated at a remote point, a common coupling impedance for said circuits comprising leads having inductance joining said common terminal with said source, and a noise protection filter at said remote point comprising capacity and inductance, part of said coupling impedance being composed of the inductance of the common leads.

8. In combination, a plurality of circuits having a common terminal, a source of energy therefor, leads having an inductive reactance component connecting said terminal with said energy source including a filter having inductance and capacity, the capacitive reactance component being proportioned with respect to the inductive reactance component to offset the inductive reactance component of the leads.

9. In combination, a plurality of circuits having a common terminal, a battery and a charging device therefor, leads having an inductive reactance component connecting said common terminal with said battery including a filter having inductance and capacity, the capacitive reactance component being proportioned with respect to the inductive reactance component to offset the inductive reactance component of the leads.

10. In combination, a plurality of subscribers' talking circuits having a common terminal, means for supplying current to said circuits from a remote source comprising a noise protection filter, and common leads having inductance, said filter having a capacitive reactance component which combines with the inductive component of said leads, to reduce the coupling impedance common to said talking circuits by virtue of the common leads, to within workable limits.

11. In combination, a plurality of subscribers' talking circuits having common terminals, a common coupling impedance for said circuits tending to produce crosstalk therebetween, said coupling impedance comprising leads common to said terminals, and a noise protection filter having a choke coil in series and a condenser in parallel with said leads, the capacity of said condenser being proportioned with respect to the inductance of the common leads to make the common coupling impedance of such a value that the objectionable effects of crosstalk are eliminated.

12. In a telephone exchange system, a plurality of discharge circuits, each having a plurality of subscribers' lines associated therewith, a filter connected to said discharge circuits for excluding noise currents therefrom, said filter having a capacitive reactance component which is compensated by the discharge circuit inductances.

13. In a telephone exchange system, the combination with a plurality of subscribers' lines having connectors for connecting them to a source of current, each connector comprising a small contact protecting condenser, of a noise protection filter having inductance and capacity, said capacity comprising said contact protecting condensers.

14. In combination, a plurality of connectors for connecting subscribers' circuits to a source of current, each connector comprising a pulsing contact with a protecting condenser in a shunt path thereto, and a wave filter associated with said circuits having capacity, said capacity comprising said contact protecting condensers.

15. In a telephone exchange, a plurality of subscribers' circuits each having a shunt path comprising a condenser, a common terminal for said circuits, a source of energy, and battery leads including a noise protection filter connecting said common terminal with said energy source, said filter having inductance and capacity, said capacity comprising the capacity of said shunting condensers.

16. In a telephone exchange, a plurality of subscribers' circuits each having a shunting condenser, a source of energy feeding said subscribers' circuits by means of common battery leads, a filter having inductance and capacity associated with said leads and said energy source, said inductance comprising the inductance of said battery leads and said capacity comprising the capacity of said shunting condensers.

17. In machine switching apparatus for a telephone exchange, a plurality of subscribers' lines, relays associated therewith for selecting the desired subscriber's line, contact protecting condensers for said relays in a shunt path to each of said subscribers' lines, means for applying energy from a source to said subscribers' circuits, and a noise protection filter having an inductance in series and a capacity in shunt to said leads, said capacity comprising said contact protecting condensers.

18. In machine switching apparatus for a telephone exchange, a plurality of subscribers' lines, relays associated therewith for selecting the desired subscriber's line, a contact protecting impendance for said relays in a shunt path to each of said subscribers' lines, means comprising common leads for supplying energy from a source to said subscribers' circuits, means for protecting said subscribers' circuits from noise currents comprising an impedance in series with said leads and an impedance in a shunt path with said leads, said shunt impedance comprising said contact protection impedance.

In witness whereof, I hereunto subscribe my name this 8th day of September A. D., 1927.

HUMPHREYS O. SIEGMUND.